US005743983A

United States Patent [19]

Ogata et al.

[11] Patent Number: 5,743,983

[45] Date of Patent: Apr. 28, 1998

[54] FORMING METHOD FOR INTERIOR TRIM MATERIAL MADE OF CORRUGATED CARDBOARD

[75] Inventors: Mitsutoshi Ogata; Kunio Cho; Yutaka Sato, all of Tokyo, Japan

[73] Assignee: Tri-Wall K.K., Tokyo, Japan

[21] Appl. No.: 734,311

[22] Filed: Oct. 21, 1996

Related U.S. Application Data

[63] Continuation of Ser. No. 119,230, Sep. 28, 1993, abandoned.

[30] Foreign Application Priority Data

Jul. 10, 1992 [JP] Japan .................................... 4-183688

[51] Int. Cl.[6] ...................................................... B32B 31/20

[52] U.S. Cl. .......................... 156/214; 156/222; 156/311; 156/322; 428/182

[58] Field of Search ..................................... 156/222, 212, 156/214, 224, 245, 311, 322; 296/211, 214; 181/286, 288, 290; 428/182

[56] References Cited

U.S. PATENT DOCUMENTS

| | | | |
|---|---|---|---|
| 3,507,730 | 4/1970 | Gambill et al. | 156/214 |
| 3,850,725 | 11/1974 | Spielau et al. | 156/322 |
| 4,249,983 | 2/1981 | Fujii | 156/475 |
| 4,416,716 | 11/1983 | Ichikawa et al. | 156/245 |

FOREIGN PATENT DOCUMENTS

| | | | |
|---|---|---|---|
| 57-2103 | 1/1982 | Japan . | |
| 57-56254 | 4/1982 | Japan . | |
| 57-100027 | 6/1982 | Japan | 156/212 |
| 58-36442 | 3/1983 | Japan . | |
| 1555882 | 11/1979 | United Kingdom . | |
| 2104447 | 3/1983 | United Kingdom . | |

OTHER PUBLICATIONS

International Search Report PCT/JP 93/00951.

*Primary Examiner*—Michele K. Yoder

*Attorney, Agent, or Firm*—Greenblum & Bernstein P.L.C.

[57] ABSTRACT

A method for producing an interior a product comprising a corrugated cardboard base formed into a predetermined shape and a decorative skin layer laminated to one side of the cardboard base. Using a hot-press, a substantially planar cardboard base comprising a corrugated core and liners laminated to both sides of the core through thermoplastic resin films is formed into a predetermined shape by heat and pressure at a temperature high enough for remaining heat to be sufficient to melt a hot melt adhesive on the surface of the cardboard base after removal of the formed cardboard base from the hot press but not so hot as to scorch the paper of the cardboard base. The formed cardboard base is then taken out of the hot press and transferred into a cold press, thereafter a decorative skin is put on the surface of the formed cardboard base through a hot melt adhesive. The formed cardboard base and the skin layer are pressed in the cold press, allowing the adhesive to be melted by the remaining heat of the cardboard base to bond the skin layer to the formed cardboard base. While the skin layer bonds to the cardboard base, the thermoplastic resin interposed between the core of the cardboard base and each liner solidifies to fix the formed shape so as to prevent spring-back. The interior trim product can be used for the ceiling of an automobile.

22 Claims, 2 Drawing Sheets

FORMING METHOD FOR INTERIOR TRIM MATERIAL MADE OF CORRUGATED CARDBOARD

This application is a continuation of application Ser. No. 08/119,230, filed Sep. 28, 1993 now abandoned, which is a National Stage Application of International Application No. PCT/JP93/00951, filed Jul 9, 1993.

TECHNICAL FIELD

The present invention relates to a method for producing an interior trim product comprising a corrugated cardboard base which has been formed into a predetermined shape and a decorative skin layer laminated to one side of the corrugated cardboard.

BACKGROUND ART

The interior trim material made of corrugated cardboard is used for the ceiling of an automobile for example and heretofore as a forming method for such interior trim material there has been known the method described in Japanese Patent Publication No. 2103/82.

According to the forming method disclosed in the said publication, a flat plate-like corrugated cardboard base comprising such a corrugated core as shown in FIG.1 and liners laminated to both sides of the corrugated core through thermoplastic resin films is formed into a shape under heating and pressure by means of a hot press, then a decorative skin layer usually constituted by a resin sheet is put on the thus-formed corrugated cardboard base through a hot melt adhesive such as hot melt sheet for example, in the same pressing die, again followed by heating and application of pressure to melt the adhesive, thereby bonding the skin layer and the corrugated cardboard base with each other.

In such a conventional method, the bonding of the skin layer to the corrugated cardboard base after the forming is performed using the hot pressing die as it is, which die has been used for heating and pressing the corrugated cardboard base. The same base is held in a heated state until completion of the bonding between the skin layer and the corrugated cardboard base and the resin films for bonding between the liners and the core are also in a melted state, so even when the resulting product is taken out from the die after completion of the bonding, it does not quickly solidify to a complete extent, resulting in the occurrence of spring-back and the formed product being often deformed.

Further in the above conventional method, since the forming process for the corrugated cardboard base and the decorative skin layer bonding process are performed using the same die, a shift to the next forming cycle cannot be made until the forming die becomes vacant after completion of the bonding of the skin layer, and thus the productivity is poor.

The present invention has been accomplished in view of the above-mentioned problems of the prior art and it is the object of the invention to provide a forming method for an interior trim material made of corrugated cardboard which method is capable of preventing the deformation caused by spring-back after the forming operation, thereby improving the quality of the product obtained, and also capable of attaining both improvement of productivity and reduction of the manufacturing cost.

DISCLOSURE OF THE INVENTION

According to the forming method of the present invention for an interior trim material made of corrugated cardboard, in order to achieve the above-mentioned object, a flat plate-like corrugated cardboard base comprising a corrugated core and liners laminated to both sides of the corrugated core through thermoplastic resin films is formed into a shape using hot press at a temperature high enough to give enough remaining heat for melting a hot melt adhesive on the surface of the corrugated cardboard base after completion of the forming operation and after removal of the thus-formed corrugated cardboard base from the die, but not so high as to scorch the constituent paper of the corrugated cardboard base. Subsequently, the thus-formed corrugated cardboard base is removed from the forming die of the hot press, then transferred immediately into a forming die of a cold press and a decorative skin layer is put on the surface of the corrugated cardboard base through a hot melt adhesive, followed by cold pressing before drop of the surface temperature of the base, allowing the adhesive to be melted by the remaining heat of the base to bond the base and the skin layer with each other.

Thermoplastic resin films interposed between the core of the corrugated cardboard core and the liners and melted in the corrugated cardboard forming process are cooled and solidified while the corrugated cardboard base is within the forming die of the cold press in the skin layer bonding process, so that the solidification proceeds to a perfect extent until removal of the formed product from the die, with no likelihood of spring-back.

Thus, the product can surely retain its formed shape and the quality thereof is improved, thereby permitting enhancement of the commodity value.

Further, when the skin layer bonding process is carried out, the hot press used in the corrugated cardboard forming process is ready for use in the next forming cycle. On the other hand, when the corrugated cardboard base forming process is carried out, the cold press used for bonding of the skin layer is ready for the next use. By alternate operations thereof it is made possible to use the apparatus efficiently. Besides, the removal of the corrugated cardboard base from the forming die of the hot press and the introduction of the corrugated cardboard base for the next forming cycle can be done during the application of pressure in the cold pressing process, while the removal of product from the die of the cold press and the introduction of the corrugated cardboard base and the skin layer for the next forming cycle can be done during the application of heat and pressure in the hot pressing process, so it is possible to make the worker's waiting time zero and thereby improve the working efficiency.

BEST MODE FOR CARRYING OUT THE INVENTION

Figure 1:
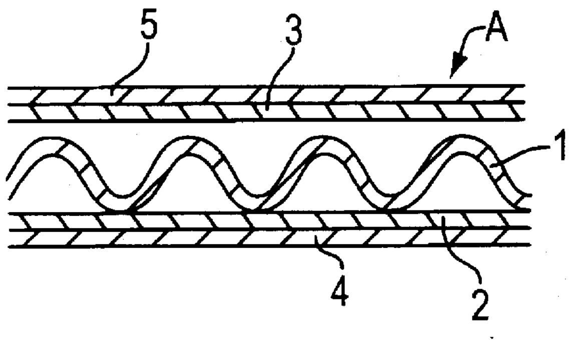
FIG. 1 is a sectional view of a flat plate-like corrugated cardboard base used in the present invention.
Figure 2:
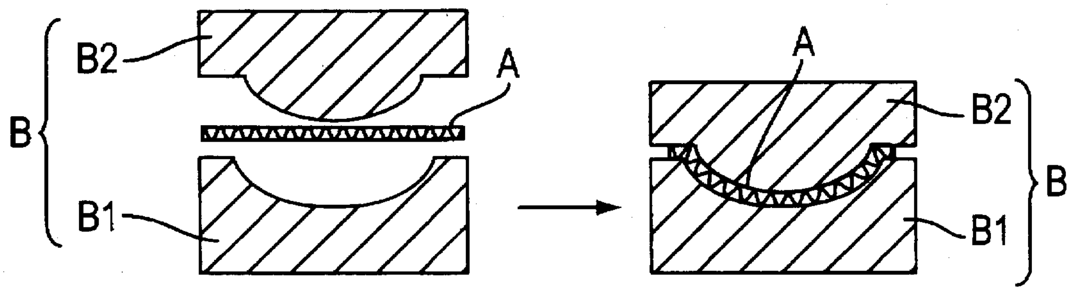
FIG. 2 is an explanatory view showing a hot pressing process for the corrugated cardboard base.
Figure 3:
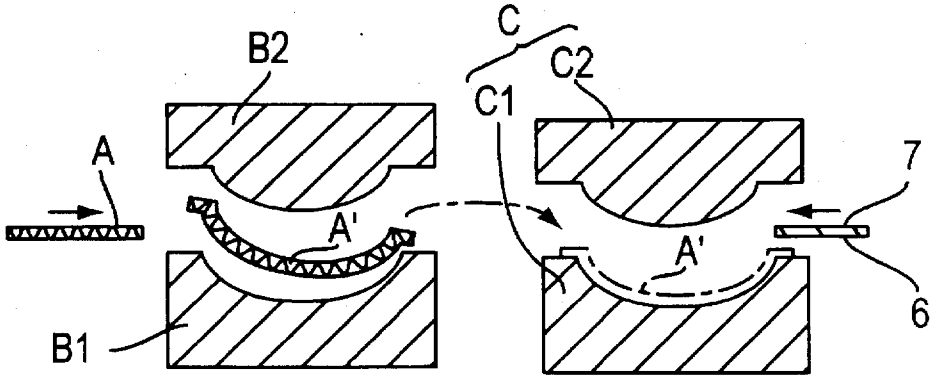
FIG. 3 is an explanatory view showing a transfer process of the corrugated cardboard base after forming into a cold press.
Figure 4:
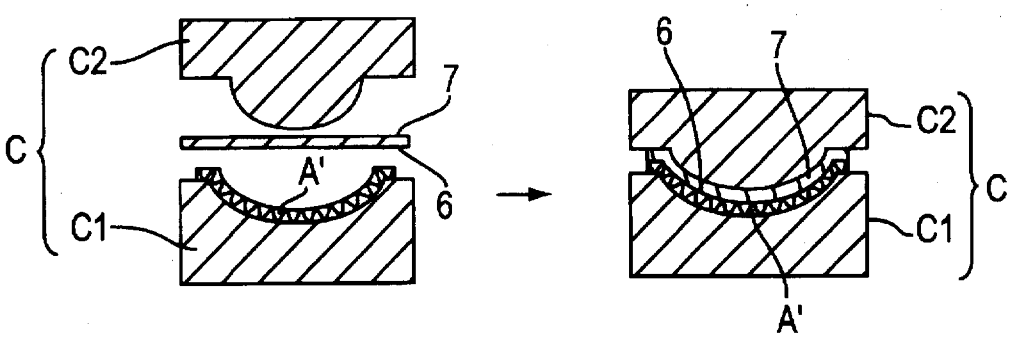
FIG. 4 is an explanatory view showing a process of bonding the corrugated cardboard base after forming and a decorative skin layer with each other, using the cold press.
Figure 5:
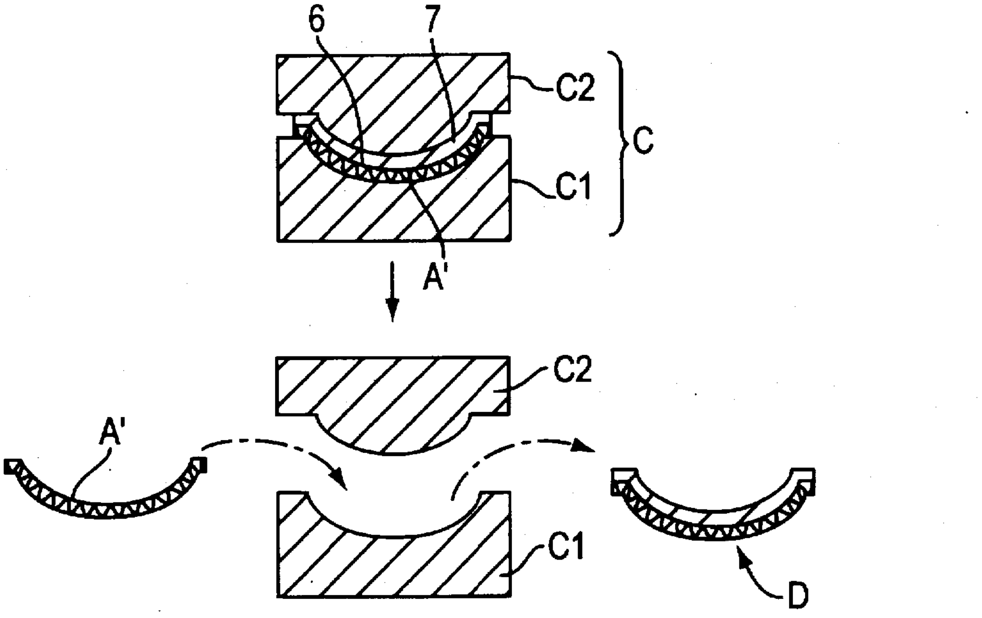
FIG. 5 is an explanatory view showing a process of removing the resulting product from the die of the cold press.
Figure 6:
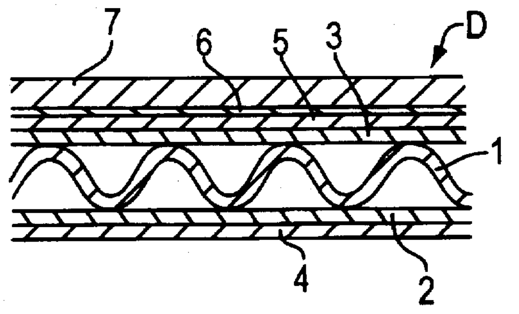
FIG. 6 is a sectional view of the resulting interior trim product made of the corrugated cardboard.

The present invention will be described below in more detail with reference to the accompanying drawings.

In the drawings, the reference mark A denotes a corrugated cardboard base used in the method of the present invention. The corrugated cardboard base A comprises a corrugated core 1 and liners 4 and 5 laminated to both sides of the core 1 through thermoplastic resin films 2 and 3, e.g. polyethylene films. One liner 4 is completely bonded to the core 1, while the other liner 5 is temporarily fixed only at its both side portions so as to permit a relative sliding of the liner and the core 1.

This corrugated cardboard base is usually in the shape of a flat plate (i.e., substantially planar).

According to the method of the present invention, first the substantially planar corrugated cardboard base A is formed into a predetermined shape by the application of heat and pressure using a hot press B.

The hot press B is of conventional known structure and shape, comprising a fixed lower die B1 as a female die and a movable upper die B2 as a male die. Though not shown, the forming surface portions of both dies B1 and B2 are heated to a predetermined forming temperature by a suitable heating means.

The corrugated cardboard base A is put on the fixed lower die B1 of the hot press B in such a manner that the liner 5 fixed temporarily to the core 1 constitutes the top surface, then the movable upper die B2 is brought down, followed by the application of heat and pressure between both dies B1 and B2 to form the corrugated cardboard base A into a predetermined shape.

In this hot pressing process, the corrugated cardboard base A is heated at a temperature high enough to give remaining heat for melting a later-described hot melt adhesive 6 on the surface of the corrugated cardboard base A' after the forming operation and after removal from the pressing die (the corrugated cardboard base after the forming will hereinafter be referred to as the "formed corrugated cardboard base") but not so high as to scorch the constituent paper of the corrugated cardboard base A.

In the case where the hot melt adhesive is a hot melt film which melts at 130° C., it is desirable that the said heating temperature be so set at 220° C. or so.

Generally in forming corrugated cardboard into a shape, there is used a hot press for melting the thermoplastic resin films 2 and 3, e.g. polyethylene films, interposed between the core 1 and the liners 4, 5, so the heating temperature is set at 130° C. or so sufficient to melt the films 2 and 3. But the adoption of a much higher heating temperature as mentioned above permits more rapid melting of the films 2 and 3, whereby it is made possible to shorten the pressing time.

After completion of the forming operation by the hot press B, the movable upper mold B2 is brought up and the formed corrugated cardboard base A' is removed from the fixed lower die B1.

At this time, the resin films 2 and 3 interposed between the core 1 and the liners 4, 5 are in a melted state and have not been solidified yet, so the formed corrugated cardboard base A' is in a possible state of spring-back.

The corrugated cardboard base A' after the forming operation and removal from the die is immediately transferred to a cold press C, in which a decorative skin layer 7 is put on the surface of the base A' through a hot melt a adhesive 6, followed by the application of pressure.

During this period, more particularly while the corrugated cardboard base A' and the decorative skin layer 7 are pressed in the cold press C, a corrugated cardboard base A for the next forming cycle is introduced into the hot press B after removal of the formed corrugated cardboard base A'.

In the case where an interior trim product D to be produced is used for the ceiling of an automobile for example, the decorative skin layer 7 is usually a resin sheet, and the hot melt adhesive 6 is, for example, a polyolefin- or polyamide-based hot melt film. This hot melt film may be laminated beforehand to the back of the decorative skin layer 7 as illustrated in the drawings, or such hot melt film may be formed in the shape of sheet and put on the formed corrugated cardboard base A' which has been transferred into the cold press C.

On the other hand, the cold press C, like the hot press B, also comprises a fixed lower die C1 as a female die and a movable upper die C2 as a male die, but is different from the hot press in that it is not provided with a heating device. Where required, the cold press may be provided with a cooling device for cooling the forming surface.

The forming portions of both upper and lower dies C1, C2 of the cold press are of just the same shapes as the shapes of the upper and lower dies B1 and B2, respectively, of the hot press B, provided there is formed a clearance which is larger by a thickness corresponding to the thickness of the decorative skin layer 7 than the clearance between the upper and lower dies B1, B2 of the hot press B.

In the cold pressing process, the corrugated cardboard base A' which has been removed from the die of the hot press B and introduced into the cold press C still has a remaining heat of about 130° C. sufficient to melt the hot melt film 6, so that the hot melt film 6 is melted by the remaining heat of the corrugated cardboard base A', and the base A' and the decorative skin layer 7 are bonded together by the application of pressure.

After the bonding of the decorative skin layer 7, the dies C1 and C2 are opened and an interior trim product D made of corrugated cardboard is obtained. In the above decorative skin layer bonding process, the temperature of the thermoplastic resins 2 and 3 interposed between the core 1 of the corrugated cardboard base A' and the liners 4, 5 drops. Therefore, solidification of the thermoplastic resins 2 and 3 proceeds during removal of the product from the die, whereby the shape of the product D is sure to be retained.

The removal of the product from the die of the cold press and the introduction of the formed corrugated cardboard base A' and skin layer 7 for the next forming cycle can be done during the heating and pressing period in the hot pressing process.

INDUSTRIAL APPLICABILITY

As described above, the forming method for an interior trim material made of corrugated cardboard according to the present invention is useful as a method for producing an interior trim product for use in automobiles, ships, houses, etc., using the corrugated cardboard base. Particularly, the method of the invention is suitable for the production of an interior trim product having a curved surface or bent portions.

We claim:

1. A method for forming an interior trim material made of corrugated cardboard, including the steps of:

forming a substantially planar corrugated cardboard base comprising a corrugated core and liners laminated to both sides of said core through thermoplastic resin films into a predetermined shape by the application of heat and pressure at a temperature high enough to give remaining heat sufficient to melt a hot melt adhesive on the surface of said corrugated cardboard base after completion of the forming operation and after removal of the thus-formed corrugated cardboard base from a die but not so high as to scorch constituent paper of the corrugated cardboard base using a hot press;

removing the thus-formed corrugated cardboard base from the die and transferring it immediately into a forming die of a cold press which has no heating device, and putting a decorative skin layer on the surface of the formed corrugated cardboard base through a hot melt adhesive; and bringing the formed corrugated cardboard base and said decorative skin layer into close contact with each other under pressure, using said cold press, and allowing said hot melt adhesive interposed between the corrugated cardboard base and the decorative skin layer to be melted by the remaining heat of the corrugated cardboard base to bond the corrugated cardboard base and the decorative skin layer with each other.

2. The method for forming of claim 1 wherein the thermoplastic resin interposed between the core of said corrugated cardboard base and each said liner and melted in the forming process for the corrugated cardboard base is solidified in the bonding process for both the corrugated cardboard base and the decorative skin layer.

3. The method according to claim 1, wherein the substantially planar corrugated cardboard base is formed into the predetermined shape at a temperature of about 220° C.

4. The method according to claim 1, wherein the corrugated cardboard base formed into the predetermined shape has a temperature of about 130° C. upon the immediate transfer into the forming die of the cold press.

5. A method for forming an interior trim material having a base of corrugated cardboard, comprising:

selecting an overall substantially planar, corrugated cardboard base;

placing the overall substantially planar corrugated cardboard base into a hot press for forming the substantially planar corrugated cardboard base into a predetermined shape;

applying heat and pressure to the overall substantially planar corrugated cardboard base, using the hot press, to melt a hot melt adhesive on a surface of the overall substantially planar corrugated cardboard base without scorching the corrugated cardboard of the overall substantially planar corrugated cardboard base;

removing the corrugated cardboard base having the predetermined shape and immediately transferring the corrugated cardboard base having the predetermined shape to a forming die of a cold press which has no heating device;

applying a skin layer to a surface of the corrugated cardboard base having the predetermined shape; and pressing the skin layer and the corrugated cardboard base having the predetermined shape together until the hot melt adhesive on the surface of the corrugated cardboard base having the predetermined shape bonds with the skin layer.

6. The method according to claim 5, wherein the overall substantially planar corrugated cardboard base is formed into the predetermined shape at a temperature of about 220° C.

7. The method according to claim 5, wherein the corrugated cardboard base formed into the predetermined shape has a temperature of about 130° C. upon the immediate transfer into the forming die of the cold press.

8. The method according to claim 5, wherein the skin layer comprises a resin sheet and the hot melt adhesive comprises a polyolefin or polyamide based film.

9. The method according to claim 5, further comprising:

maintaining the skin layer and the corrugated cardboard base having the predetermined shape in the cold press at least until solidification of the hot melt adhesive has begun such that the predetermined shape is sure to be retained in the cardboard base as well as the skin layer upon removal from the cold press.

10. The method of claim 5, further comprising:

placing another overall substantially planar corrugated cardboard base into the hot press for forming the another overall substantially planar corrugated cardboard base into a predetermined shape, while the corrugated cardboard base having a predetermined shaped is in the cold press.

11. A method for forming an interior trim material having a base of corrugated cardboard, comprising:

selecting an overall substantially planar corrugated cardboard base;

placing the overall substantially planar corrugated cardboard base into a hot press for forming the overall substantially planar corrugated cardboard base into a predetermined shape;

applying heat and pressure to the overall substantially planar corrugated cardboard base, using the hot press, to heat the overall substantially planar corrugated cardboard base without scorching the corrugated cardboard of the overall substantially planar corrugated cardboard base;

removing the corrugated cardboard base having the predetermined shape and immediately transferring the corrugated cardboard base having the predetermined shape to a forming die of a cold press which has no heating means;

applying a hot melt adhesive film to a surface of the corrugated cardboard base having the predetermined shape and located in the forming die of the cold press;

applying a skin layer to a surface of the hot melt adhesive film; and pressing the skin layer, hot melt adhesive film and corrugated cardboard base having the predetermined shape together until the hot melt adhesive on the surface of the corrugated cardboard base having the predetermined shape bonds with the corrugated cardboard base having the predetermined shape and the skin layer.

12. The method according to claim 11, wherein the overall substantially planar corrugated cardboard base is formed into the predetermined shape at a temperature of about 220° C.

13. The method according to claim 11, wherein the corrugated cardboard base formed into the predetermined shape has a temperature of about 130° C. upon the immediate transfer into the forming die of the cold press.

14. The method according to claim 11, wherein the skin layer comprises a resin sheet and the hot melt adhesive comprises a polyolefin or polyamide based film.

15. The method according to claim 11, further comprising:

maintaining the skin layer and the corrugated cardboard base having the predetermined shape in the cold press at least until solidification of the hot melt adhesive has begun such that the predetermined shape is sure to be retained in the cardboard base as well as the skin layer upon removal from the cold press.

16. The method of claim 11, further comprising:

placing another overall substantially planar corrugated cardboard base into the hot press for forming the another overall substantially planar corrugated cardboard base into a predetermined shape, while the corrugated cardboard base having a predetermined shape is in the cold press.

17. The method according to claim 1, wherein the cold press includes a cooling device for cooling a forming surface of the cold press.

18. The method according to claim 1, wherein, upon the immediate transfer of the formed corrugated cardboard base into the forming die of the cold press, the corrugated cardboard base has a temperature of at least about 130° C. to sufficiently melt the hot melt adhesive.

19. The method according to claim 5, wherein the cold press includes a cooling device for cooling a forming surface of the cold press.

20. The method according to claim 5, wherein, upon the immediate transfer of the formed corrugated cardboard base into the forming die of the cold press, the corrugated cardboard base has a temperature of at least about 130° C. to sufficiently melt the hot melt adhesive.

21. The method according to claim 11, wherein the cold press includes a cooling device for cooling a forming surface of the cold press.

22. The method according to claim 11, wherein, upon the immediate transfer of the formed corrugated cardboard base into the forming die of the cold press, the corrugated cardboard base has a temperature of at least about 130° C. to sufficiently melt the hot melt adhesive.

* * * * *

UNITED STATES PATENT AND TRADEMARK OFFICE

CERTIFICATE OF CORRECTION

PATENT NO. : 5,743,983

DATED : April 28, 1998

INVENTOR(S) : M. OGATA et al.

It is certified that error appears in the above-identified patent and that said Letters Patent is hereby corrected as shown below:

On the cover page of the printed patent, paragraph [57] ABSTRACT, line 1, change "a product" to ---trim product---.

Signed and Sealed this

Sixth Day of April, 1999

Attest:

Q. TODD DICKINSON

*Attesting Officer*

*Acting Commissioner of Patents and Trademarks*